United States Patent
Ramstein et al.

(10) Patent No.: US 10,503,255 B2
(45) Date of Patent: Dec. 10, 2019

(54) HAPTIC FEEDBACK ASSISTED TEXT MANIPULATION

(75) Inventors: Christophe Ramstein, San Francisco, CA (US); David Birnbaum, Oakland, CA (US)

(73) Assignee: IMMERSION CORPORATION, San Jose, CA (US)

( * ) Notice: Subject to any disclaimer, the term of this patent is extended or adjusted under 35 U.S.C. 154(b) by 437 days.

(21) Appl. No.: 12/958,705

(22) Filed: Dec. 2, 2010

(65) Prior Publication Data

US 2012/0139844 A1    Jun. 7, 2012

(51) Int. Cl.
| | |
|---|---|
| *G06F 3/01* | (2006.01) |
| *G06F 3/0488* | (2013.01) |
| *G06F 17/24* | (2006.01) |

(52) U.S. Cl.
CPC ............ *G06F 3/016* (2013.01); *G06F 3/0488* (2013.01); *G06F 17/24* (2013.01)

(58) Field of Classification Search
CPC .. G06F 3/041; G06F 3/04886; G06F 3/04895; G06F 3/016; G06F 17/24; G06F 3/0488
USPC ................ 345/173; 715/701, 702; 340/407.2
See application file for complete search history.

(56) References Cited

U.S. PATENT DOCUMENTS

| | | | |
|---|---|---|---|
| 5,663,748 A * | 9/1997 | Huffman et al. | ............. 345/173 |
| 6,078,308 A * | 6/2000 | Rosenberg et al. | ........... 715/856 |
| 6,519,584 B1* | 2/2003 | Tognazzini et al. | .......... 715/769 |
| 6,943,778 B1* | 9/2005 | Astala | ................... G06F 3/0488 345/1.1 |
| 7,336,260 B2 | 2/2008 | Martin et al. | |
| 7,768,504 B2 | 8/2010 | Rosenberg et al. | |
| 2002/0109668 A1* | 8/2002 | Rosenberg | ............. G05G 9/047 345/156 |
| 2006/0109256 A1* | 5/2006 | Grant | ....................... G06F 3/016 345/173 |
| 2009/0102805 A1* | 4/2009 | Meijer et al. | ................. 345/173 |
| 2009/0128505 A1* | 5/2009 | Partridge et al. | ............. 345/173 |
| 2009/0167508 A1 | 7/2009 | Fadell et al. | |
| 2009/0167509 A1* | 7/2009 | Fadell | ..................... G06F 3/016 340/407.2 |
| 2010/0289757 A1* | 11/2010 | Budelli | ............... G06F 3/04842 345/173 |
| 2010/0315345 A1* | 12/2010 | Laitinen | .................. G06F 3/016 345/173 |

FOREIGN PATENT DOCUMENTS

| | | | |
|---|---|---|---|
| CN | 101547253 A | | 9/2009 |
| EP | 2105844 A2 | | 9/2009 |
| JP | 3408332 B2 * | | 5/2003 |
| WO | 2008037275 A1 | | 4/2008 |
| WO | WO 2008037275 A1 * | 4/2008 | ............. G06F 3/016 |
| WO | WO-2008037275 A1 * | 4/2008 | ............. G06F 3/016 |
| WO | 2010105010 A1 | | 9/2010 |

\* cited by examiner

*Primary Examiner* — Patrick N Edouard
*Assistant Examiner* — Douglas M Wilson
(74) *Attorney, Agent, or Firm* — Miles & Stockbridge P.C.

(57) ABSTRACT

A system with a touchscreen generates haptic effects in response to a manipulation of text displayed on the touchscreen. The system senses a touch within the text, and determines if the touch is a manipulation of the text, and determines the type of the manipulation. The system then generates a type of haptic event that is based at least in part on the type of the manipulation that was determined.

30 Claims, 5 Drawing Sheets

HAPTIC FEEDBACK ASSISTED TEXT MANIPULATION

FIELD

One embodiment is directed generally to a computer touchscreen, and in particular to haptic feedback for a computer touchscreen.

BACKGROUND INFORMATION

A touchscreen is an electronic visual display that can detect the presence and location of a touch within the display area. A "touch" generally refers to a contact of the finger or hand with the display of the device. Touchscreens can also sense other passive or active objects, such as styli.

A touchscreen has two main attributes. First, it enables one to interact directly with what is displayed, rather than indirectly through a cursor controlled by a mouse or touchpad. Second, it lets one do so without requiring any intermediate device that would otherwise need to be held in the hand. Touchscreens can be attached to computers, or to networks as terminals. They also play a prominent role in the design of digital appliances such as personal digital assistants ("PDAs"), personal media players ("PMPs"), satellite navigation devices, mobile phones, and video games.

Touchscreens are increasingly being used with computers or computer "pads" that implement typical "office" applications such as word processing, spreadsheets, etc. The touch functionality can sometimes enhance the user experience of these applications.

SUMMARY

One embodiment is a system with a touchscreen that generates haptic effects in response to a manipulation of text displayed on the touchscreen. The system senses a touch within the text, and determines if the touch is a manipulation of the text, and determines the type of the manipulation. The system then generates a type of haptic event that is based at least in part on the type of the manipulation that was determined.

DETAILED DESCRIPTION

One embodiment is a device having a touchscreen that facilitates a user's manipulation of text by incorporating haptic feedback effects in response to a user's gestures and/or based on the content of the text. Therefore, a user can more easily and efficiently manipulate and interact with text, regardless of the size of the text, the size of the touchscreen, or whether the user can see the text under the user's pointing finger or other object.

Figure 1:
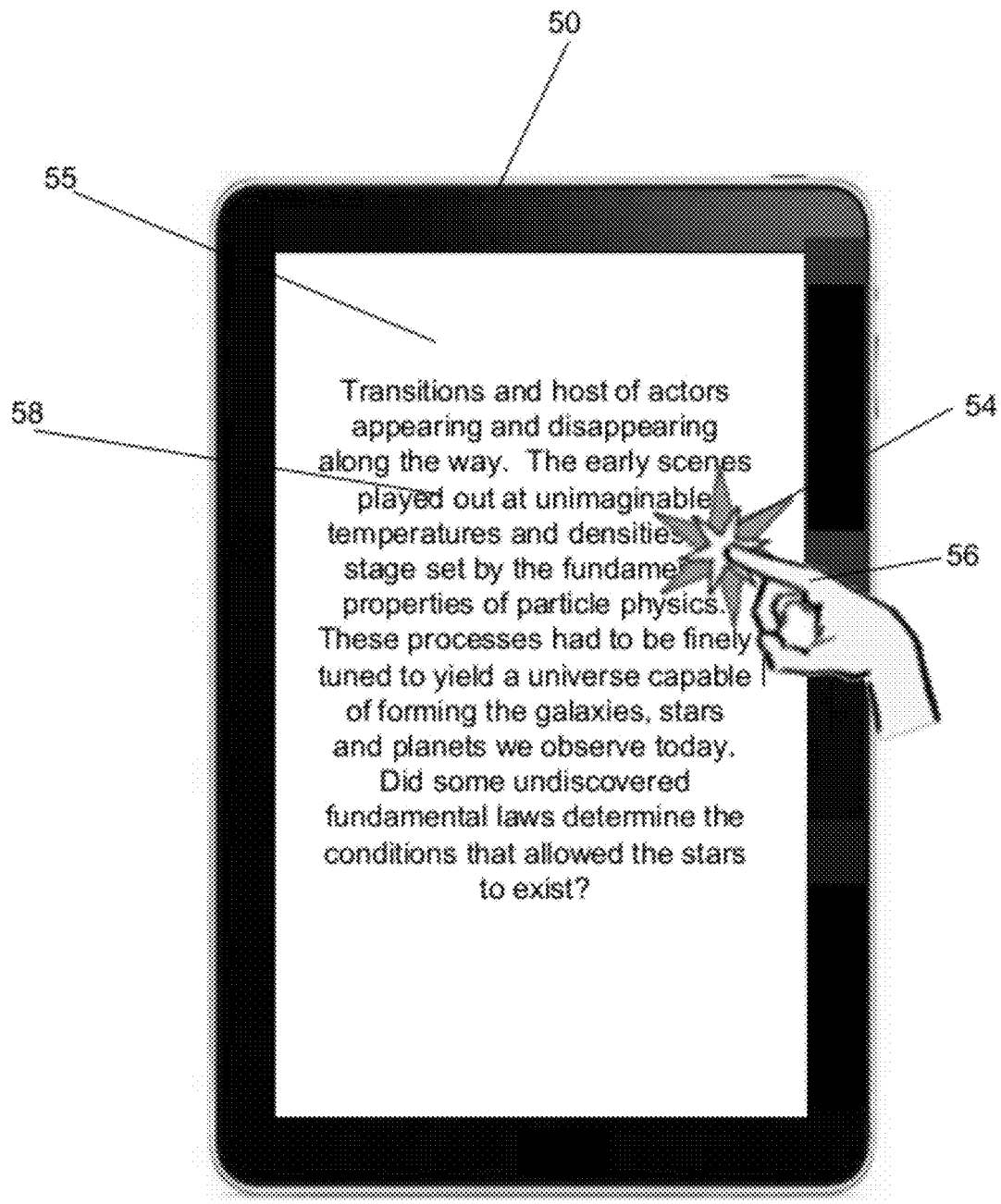
FIG. 1 is a top view of a device in accordance with one embodiment of the invention.

FIG. 1 is a top view of a device 50 in accordance with one embodiment of the invention. Device 50, as shown, is a handheld computer tablet or pad and includes a touchscreen 55. However, device 50 in other embodiments can be any type of handheld device that includes a touchscreen, including a PDA, portable media player, portable gaming device, etc. Device 50 executes applications that generate text 58, and allows a user to interact with and manipulate text 58 using a finger 56 or other object. In response to the interaction, device 50 generates haptic feedback 54, which may be in the form of a vibration that can be felt by finger 56. Device 50 may also optionally allow the user to manipulate text 58 using other interface devices, such as a mouse, touchpad, etc.

The manipulation of text may include any task that a user may perform on, or in response to, displayed text/characters. Examples of manipulation include a user moving a cursor within the body of the text, selecting specific characters, words, or lines among displayed text, and copying and pasting portions of displayed text, changing the position of portions of the text, deleting text, changing text styles (e.g., weight, obliqueness, etc.), sizes, color, or typeface (e.g., font), order (e.g., an alphabetical list), formatting such as tabulation, outlining, line spacing, kerning, or other actions.

Figure 2:
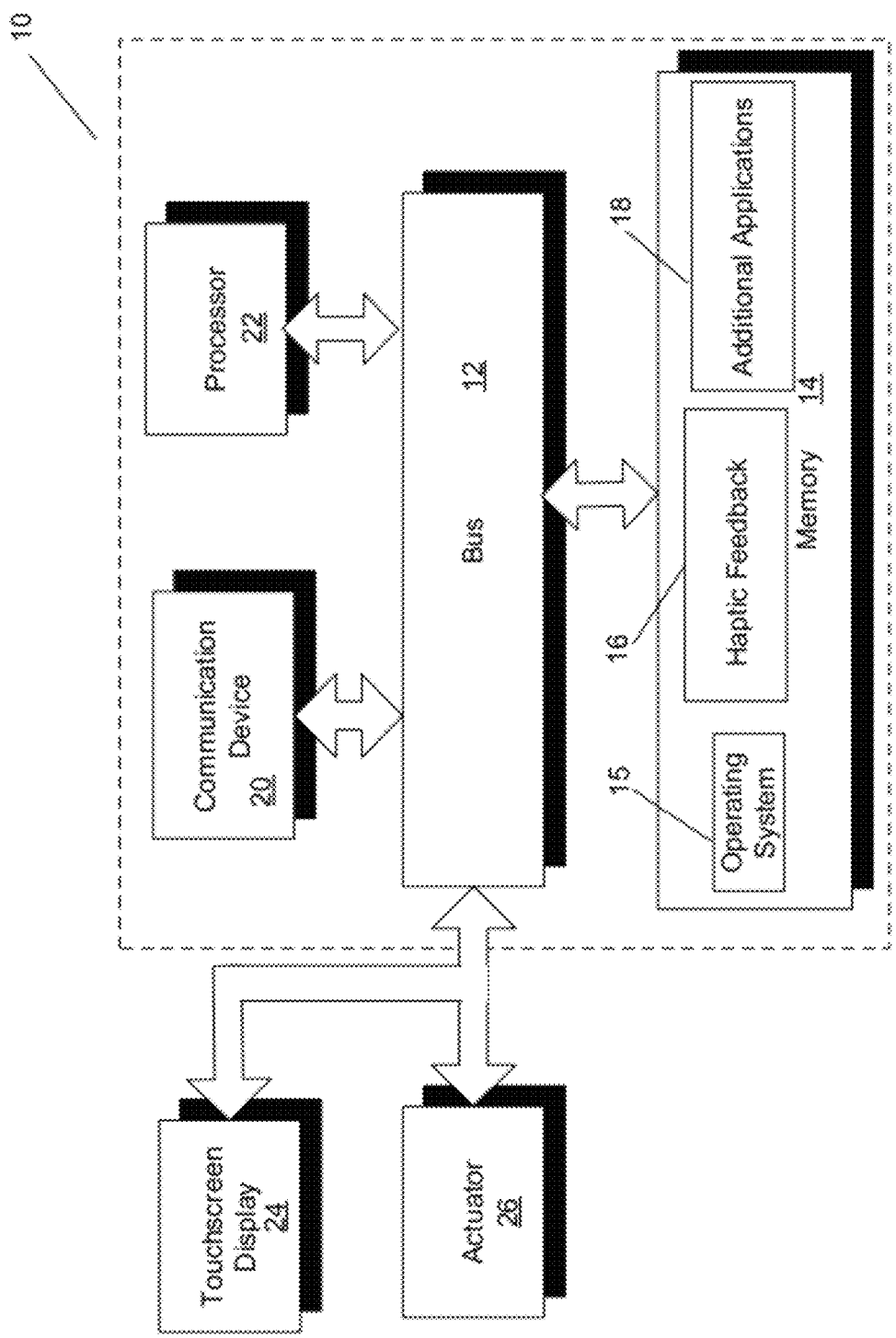
FIG. 2 is a block diagram of a haptic feedback system in accordance with one embodiment of the present invention.

FIG. 2 is a block diagram of a haptic feedback system 10 in accordance with one embodiment of the present invention. System 10 is part of device 50 of FIG. 1, and it provides the haptic feedback in response to text manipulation functionality. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

In one embodiment, memory 14 stores software modules that provide functionality when executed by processor 22. The modules include an operating system 15 that provides operating system functionality for system 10, as well as the rest of device 50 in one embodiment. The modules further include a haptic feedback module 16 that recognizes text manipulation and generates haptic feedback, as disclosed in more detail below. System 10 will typically include one or more additional application modules 18 to include additional functionality, such as a word processing application to generate text 58 of FIG. 1, if it is not already incorporated in module 16.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a touchscreen display 24, for displaying a graphical representation or user interface to a user and recognizing user touches. Touchscreen display 24 may be any type of touchscreen, including a multi-touch touch screen.

System 10 further includes one or more actuators 26. Processor 22 may transmit a haptic signal associated with a haptic effect or "haptic event" to actuator 26, which in turn outputs haptic feedback/effects. Actuator 26 may be, for example, an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA"). For device 50 of FIG. 1, actuator 26 may be coupled to touchscreen 55, the housing of device 50, or located remotely from device 50, but still accessible to the user. For example, haptic feedback generated by signals from processor 22 may be "displayed" or felt at a user's remote telephone or watch.

In one embodiment, a user drags a finger across the text, and one or more types of haptic feedback can provide information to the user regarding the position of the finger relative to the text. In one embodiment, the haptic feedback is a vibration generated by an actuator, and different types of haptic feedback, or different haptic feedback "events" that are distinguishable by the user, can be generated by varying the amplitude and/or frequency of the vibration, or varying the time duration of an individual haptic event. In some embodiments, in conjunction with the haptic feedback, the text is magnified so that the cursor position, which would normally be visually blocked by the user's finger, can be detected.

Figure 3:
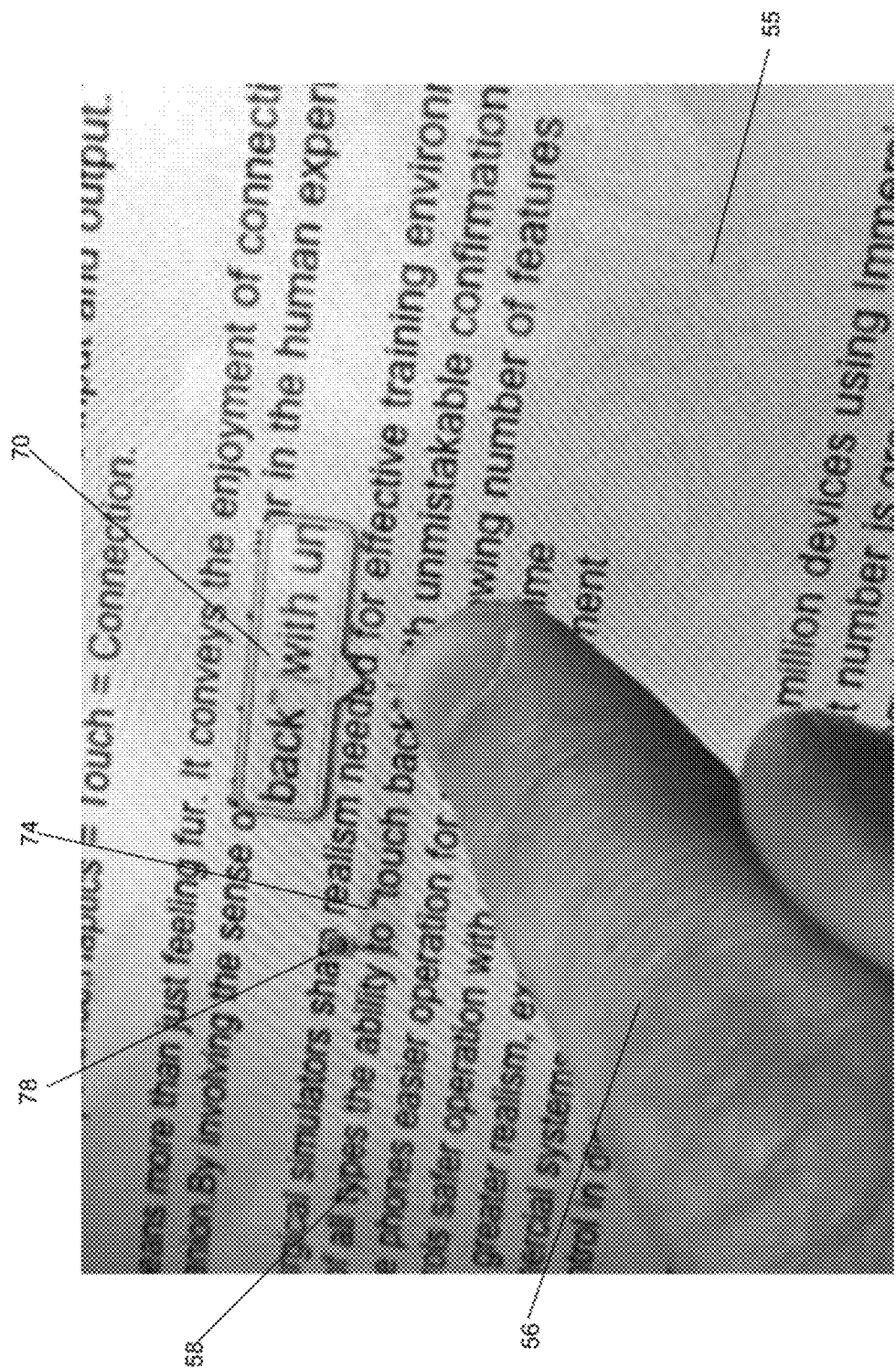
FIG. 3 illustrates one embodiment of an invention to provide haptic feedback in response to text manipulation.

FIG. 3 illustrates one embodiment of an invention to provide haptic feedback in response to text manipulation. As shown in FIG. 3, finger 56 selects a portion of text 58 via touching touchscreen 55. In the embodiment of FIG. 3, a magnification window 70 is generated for displaying the text covered by finger 56 (i.e., "back' with un"). A "handle" 78 is displayed when the user initially touches text 58, which indicates the initial position of the cursor. As finger 56 slides right or left from handle 78, that portion of the text is highlighted (highlighting 74), indicating that the user is selecting that portion of the text. As finger 56 slides across text 58, different haptic events are generated indicating, for example, whether finger 56 is covering a text character, or at a space between characters or between words.

Figure 4:
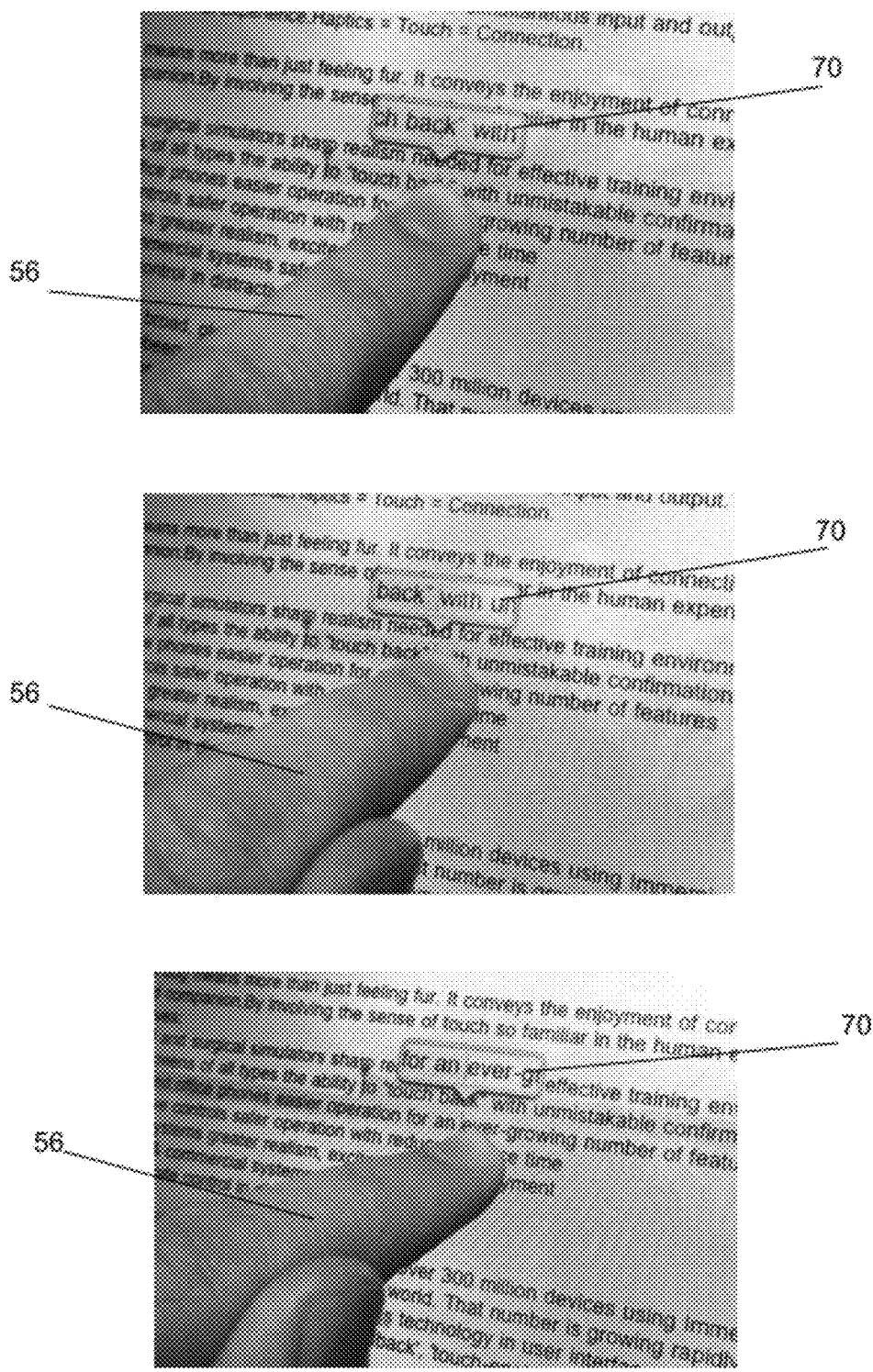
FIG. 4 illustrates the progression of a magnification window as a finger moves left to right and selects/highlights an increasing amount of words.

FIG. 4 illustrates the progression of magnification window 70 as finger 56 moves left to right and selects/highlights an increasing amount of words. As shown, window 70 progresses from displaying "ch back' with" to "back' with un" to "for an ever-gr" as finger 56 blocks different words of text 58.

As finger 56 touches or slides across text 58, different haptic events can be generated depending on the position of finger 56, the context of the text, etc. For example, if a character is selected, a certain haptic feedback event is generated. Unique characters can be tied to unique haptic events. Groups of characters can be tied to groups of haptic events. Further, if a full word is selected, a different haptic event is generated. Full word selection can be achieved by looking for selection of spaces, or other means. Further, if a line is selected, a different haptic event is generated. Line selection can be achieved by looking for selection of new line characters, or other means. Still further, if a paragraph is selected, a different haptic event is generated. Paragraph selection can be achieved by looking for selection of new paragraph characters, or other means.

Further, a haptic event can be generated at the end of a selected item. For example, if a word, sentence, or paragraph is selected, the haptic event is generated when the end of the word, sentence, or paragraph is reached. The generation may be dependent on the direction of the gesture so, for example, for a word, if the direction is from left to right, the haptic event is generated when the last letter is reached, and if the direction is from right to left, the haptic event is generated when the first letter is reached (assuming the text is meant to be read from left to right).

In one embodiment, the type of haptic event can be affected by other gestural parameters, such as speed. For example, fast gestures could result in filtering out some of the haptic events that would normally occur during slow gestures. Therefore, if a user is slowly moving a finger across text, haptic feedback can allow the user to feel each character by varying the type of haptic event when encountering the space between characters. However, if the user is more quickly moving a finger across text, haptic feedback can allow the user to feel each individual word rather than character by varying the type of haptic event when encountering the space between words. Other variations of speed could result, for example, in a sentence or paragraph being distinguished by haptic events.

Figure 5:
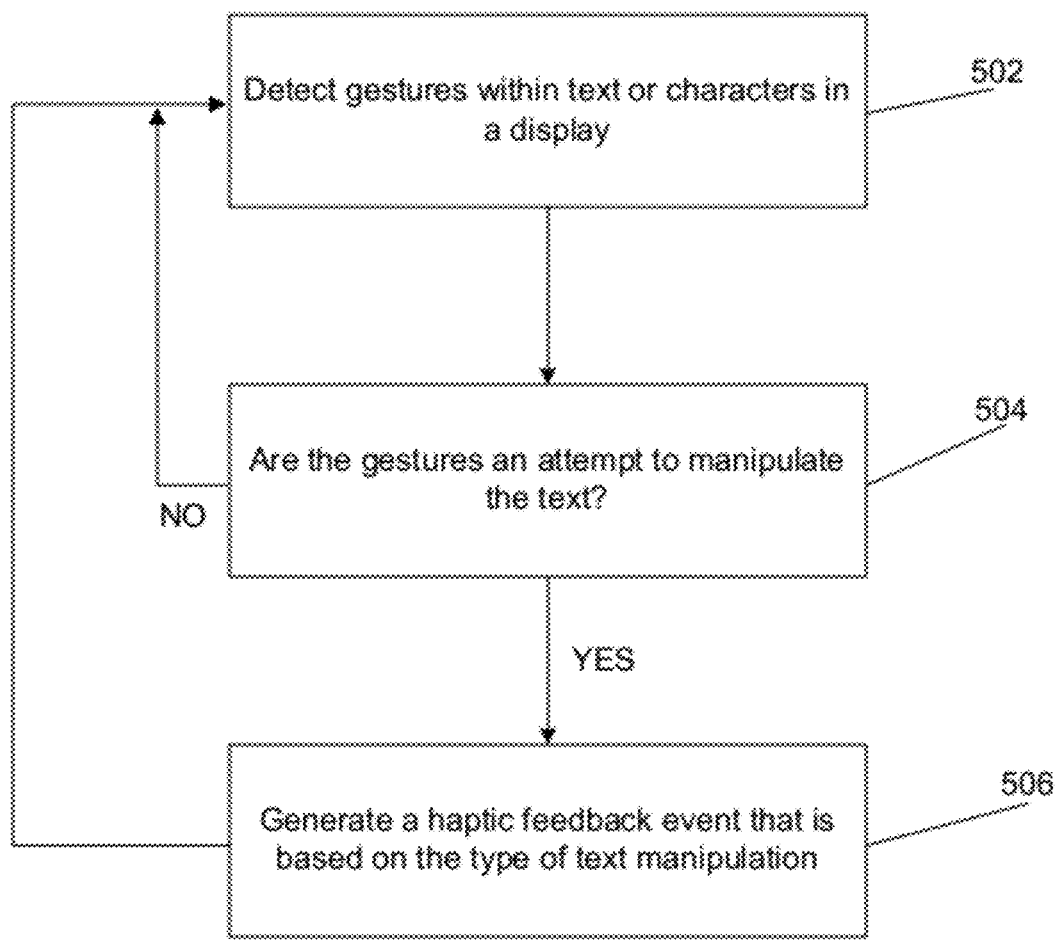
FIG. 5 is a flow diagram of the functionality of a haptic feedback module when generating haptic feedback in response to text manipulation in accordance with one embodiment.

FIG. 5 is a flow diagram of the functionality of haptic feedback module 16 when generating haptic feedback in response to text manipulation in accordance with one embodiment. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, module 16 detects gestures within generated text or characters in a display such as touchscreen 55 of FIG. 1. The "text" may be any type of characters that are generated by an application, or data that is displayed as a result of a database query or other generation. In general, the text is dynamically generated, and is different from more static input controls or other types of user interfaces that are used to control or modify text or data. In most embodiments, the text is displayed in a region of the display that is separate from UI controls and other non-textual areas.

At 504, if the gesture is determined to be a user's finger or other object being applied to text, module 16 determines if the user is trying to select text or trying to place a cursor within text or otherwise attempting to manipulate text.

At 506, if yes at 504, haptic feedback events are retrieved and/or generated based on the type of text selection or cursor insertion. For example, a different haptic event may be generated depending on whether a character, word, line, or paragraph is being selected.

The haptic events can be provided when a cursor is moved within the text, rather than during selection. Cursor placement could feel different from selection, to differentiate it, or the same, to emphasize user experience consistency.

In one embodiment, haptic feedback can also be provided on other "points of interest" when selections occur using intelligent text processing to determine different haptic events to apply to different portions of text. For example, a haptic effect could be played when the user selects the name of a contact, or a sequence of numbers recognized to be a phone number. For example, in a text such as an email, there may be an embedded address. The address can generate a unique haptic effect when touched by a user, so it can be easily distinguished from the rest of the text. Therefore, the user can select the text address, assisted by the haptic feedback, and, for example, paste the address in another application.

A haptic effect can be generated based on the semantic context of text. For example, if the text is semantically processed or annotated with a formal description of concepts, terms, and relationships within a given knowledge domain, these annotations could generate haptic effects.

A haptic event can signify the availability of operations to be done on selected text. For example, a certain haptic feedback effect could be generated if the selected text is eligible for a "paste" command, or vice versa. Further, other text selection/manipulation functions such as cut, copy, paste, insert, etc. can each have unique haptic effects and can be tied to selection. For example, the haptic effect associated with "paste" might have a strength that varies along with the volume of text being pasted. The intensity of the paste effect may be a reflection of the sum total of the haptic intensities generated by each individual character as it was selected.

Although embodiments illustrate "text", in other embodiments the manipulation of a user interface ("UI") element or other type of "object" selection may be detected, including icons, images, or other virtual/UI objects displayed on the screen that the user might want to select with screen gestures. For example, if an image having a foreground section and background section is displayed, a haptic event can be generated as a user's finger moves from the foreground to the background. Further, if multiple icons are displayed, haptic effects can be varied as a user moves between icons.

As disclosed, embodiments generate varied haptic events as a user manipulates text other types of characters, or other information. The varied haptic events assist the user in performing the interaction, such as copying and pasting text, selection of text, cursor insertion within text, etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

For example, instead of a vibration based haptic event, the display may be formed of a polymorphic surface (i.e., deformable surface actuators), so that the haptic effect could be a static change to the screen's surface rather than a vibration, or a change of friction. Further, forces or electrotactile stimulation can be used instead of vibration.

What is claimed is:

1. A non-transitory computer readable medium having instructions stored thereon that, when executed by a processor, cause the processor to provide haptic feedback on a device comprising a touchscreen, the haptic feedback comprising:
   displaying dynamically generated text comprising a plurality of characters comprising graphical objects;
   sensing a touch by a user's finger within the dynamically generated text;
   determining if the touch is a manipulation of the dynamically generated text and determining a type of the manipulation, wherein the manipulation of the dynamically generated text comprises performing a task on the dynamically generated text using the touch, wherein the task comprises sliding the finger across the dynamically generated text and moving at least one of the characters within the dynamically generated text via the sliding; and
   while the finger is being slid across the dynamically generated text and is performing the task, generating a type of haptic event based at least in part on the type of the manipulation, wherein the haptic event generates the haptic feedback that is applied to the finger during the sliding;
   wherein each type of manipulation includes the moving of at least one of the characters, and a first type of manipulation comprises moving a word within the dynamically generated text, and a second type of manipulation comprises moving a graphical object, and
   wherein the type of haptic event is one of a plurality of different types of haptic events each being associated with a corresponding one of the different types of manipulation.

2. The non-transitory computer readable medium of claim 1, wherein the manipulation comprises a selection of the dynamically generated text.

3. The non-transitory computer readable medium of claim 1, wherein a third type of manipulation comprises moving a cursor within the dynamically generated text.

4. The non-transitory computer readable medium of claim 1, wherein the manipulation comprises copying, moving, and pasting the dynamically generated text.

5. The non-transitory computer readable medium of claim 2, wherein the selection of the dynamically generated text comprises one of selecting one of the characters, a word, a sentence, or a paragraph, and a first haptic event is generated for each of the characters, the word, the sentence, and the paragraph.

6. The non-transitory computer readable medium of claim 1, wherein types of haptic events are generated by varying one or more of an amplitude, a time duration, or a frequency of a vibration.

7. The non-transitory computer readable medium of claim 1, further comprising:
   determining a portion of the dynamically generated text that is blocked by the touch; and
   generating and displaying a magnification window that includes the portion of the dynamically generated text.

8. The non-transitory computer readable medium of claim 1, wherein the type of haptic event is based at least on a speed of the sliding.

9. The non-transitory computer readable medium of claim 8, wherein if the speed is a first amount, a first type of haptic event provides an individual character feeling, and if the speed is a second amount greater than the first amount, a second type of haptic event provides an individual word feeling.

10. The non-transitory computer readable medium of claim 1,
    wherein determining the type of the manipulation comprises determining if a point of interest of the dynamically generated text is touched, and
    wherein the point of interest comprises at least one of a name of a contact, a telephone number, and or an address.

11. The non-transitory computer readable medium of claim 2, wherein the type of haptic event is based at least on an availability of operations for the selected dynamically generated text.

12. The non-transitory computer readable medium of claim 11, wherein the availability of operations comprises at least one of cut, copy, paste or insert.

13. The non-transitory computer readable medium of claim 12, wherein the haptic event generated in response to the availability of the paste comprises a strength based on a volume of selected dynamically generated text.

14. A computer implemented method for providing haptic feedback on a device comprising a touchscreen, the method implemented by a processor and comprising:
displaying dynamically generated text comprising a plurality of characters comprising graphical objects;
sensing by the processor a touch by a user's finger within the dynamically generated text;
determining by the processor if the touch is a manipulation of the dynamically generated text and determining a type of the manipulation, wherein the manipulation of the dynamically generated text comprises performing a task on the dynamically generated text using the touch, wherein the task comprises sliding the finger across the dynamically generated text and moving at least one of the characters within the dynamically generated text via the sliding; and
while the finger is being slid across the dynamically generated text and is performing the task, generating by the processor a type of haptic event based at least in part on the type of the manipulation, wherein the haptic event generates the haptic feedback that is applied to the finger during the sliding;
wherein each type of manipulation includes the moving of at least one of the characters, and a first type of manipulation comprises moving a word within the dynamically generated text, and a second type of manipulation comprises moving a graphical object, and
wherein the type of haptic event is one of a plurality of different types of haptic events each being associated with a corresponding one of the different types of manipulation.

15. The method of claim 14, wherein the manipulation comprises a selection of the dynamically generated text.

16. The method of claim 14, wherein a third type of manipulation comprises moving a cursor within the dynamically generated text.

17. The method of claim 14, wherein the manipulation comprises copying, moving, and pasting the dynamically generated text.

18. The method of claim 15, wherein the selection of the dynamically generated text comprises one of selecting one of the characters, a word, a sentence, or a paragraph, and a different type of haptic event is generated for each of the characters, the word, the sentence, and the paragraph.

19. The method of claim 14, wherein different types of haptic events are generated by varying one or more of an amplitude, a time duration, or a frequency of a vibration.

20. The method of claim 14, further comprising:
determining a portion of the dynamically generated text that is blocked by the touch; and
generating and displaying a magnification window that includes the portion of the dynamically generated text.

21. The method of claim 14, wherein the type of haptic event is based at least on a speed of the sliding.

22. An apparatus comprising:
a processor;
a non-transitory memory coupled to the processor and storing instructions;
a touchscreen coupled to the processor;
an actuator coupled to the processor;
wherein the instructions, when executed by the processor, cause the apparatus to:
dynamically generate text from a word processing application executed by the processor;
display the dynamically generated text comprising a plurality of characters comprising graphical objects;
sense a touch by a user's finger within the dynamically generated text;
determine if the touch is a manipulation of the dynamically generated text and determining a type of the manipulation, wherein determining the type of the manipulation comprises determining if a point of interest of the dynamically generated text is touched, and wherein the manipulation of the dynamically generated text comprises performing a task on the dynamically generated text using the touch, wherein the task comprises sliding the finger across the dynamically generated text and moving at least one of the characters within the dynamically generated text via the sliding; and
while the finger is being slid across the dynamically generated text and is performing the task, generate a type of haptic event with the actuator based at least in part on the type of the manipulation, wherein the haptic event generates a haptic feedback that is applied to the finger during the sliding;
wherein each type of manipulation includes the moving of at least one of the characters, and a first type of manipulation comprises moving a word within the dynamically generated text, and a second type of manipulation comprises moving a graphical object, and
wherein the type of haptic event is one of a plurality of different types of haptic events each being associated with a corresponding one of the different types of manipulation.

23. The apparatus of claim 22, wherein the manipulation comprises a selection of the dynamically generated text.

24. The apparatus of claim 22, wherein a third type of manipulation comprises moving a cursor within the dynamically generated text.

25. The apparatus of claim 22, wherein the manipulation comprises copying, moving, and pasting the dynamically generated text.

26. The apparatus of claim 23, wherein the selection of the dynamically generated text comprises one of selecting one of the characters, a word, a sentence, or a paragraph, and a different type of haptic event is generated for each of the characters, the word, the sentence, and the paragraph.

27. The computer readable medium of claim 1, wherein determining the type of the manipulation comprises determining if the dynamically generated text comprises a semantic annotation.

28. The computer readable medium of claim 1, further comprising:
sensing a second touch within an image having a background and a foreground, wherein the touch traverses the foreground to the background;
generating a haptic event when the second touch moves to the background.

29. The computer readable medium of claim 2, wherein the selection of the dynamically generated text comprises selecting an item comprising a word, sentence or paragraph, and the haptic event is generated when the touch reaches an end of the item.

30. The computer readable medium of claim 1, wherein types of haptic events are generated by at least one of a vibration, a local deformation of a surface, or a change of friction.

\* \* \* \* \*